Aug. 4, 1925.

H. FLETCHER 1,548,592

TESTING CIRCUITS

Filed Nov. 16, 1921

Inventor:
Harvey Fletcher
by Joel R. Palmer  Atty.

Patented Aug. 4, 1925.

1,548,592

UNITED STATES PATENT OFFICE.

HARVEY FLETCHER, OF NEW YORK, N. Y., ASSIGNOR TO WESTERN ELECTRIC COMPANY, INCORPORATED, OF NEW YORK, N. Y., A CORPORATION OF NEW YORK.

TESTING CIRCUITS.

Application filed November 16, 1921. Serial No. 515,461.

*To all whom it may concern:*

Be it known that I, HARVEY FLETCHER, a citizen of the United States, residing at New York city, in the county of New York, State of New York, have invented certain new and useful Improvements in Testing Circuits, of which the following is a full, clear, concise, and exact description.

This invention relates to measuring systems and particularly to the method of measuring the efficiency of electrical speech transmission instruments.

An object of this invention is to provide an organization of apparatus, which is simple and suitable for both laboratory and commercial engineering practice for measuring directly the efficiency of speech transmission instruments.

Other objects will appear hereinafter.

The efficiency of any translating device is usually taken as the ratio of the useful energy derived, to the energy transformed. This same general idea, but modified to meet the requirements of engineering practice, is applied to transmitters and receivers in measuring their efficiency.

In general, the invention consists in means whereby the efficiency of electrical speech transmission instruments may be directly measured by comparison with a standard instrument, in appropriate units, such as miles of standard cables.

Figure 1:
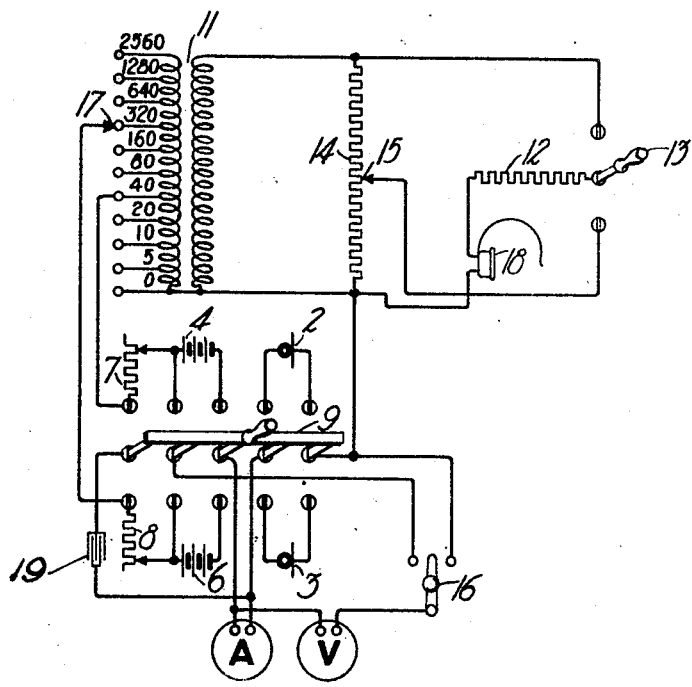
Figure 2:
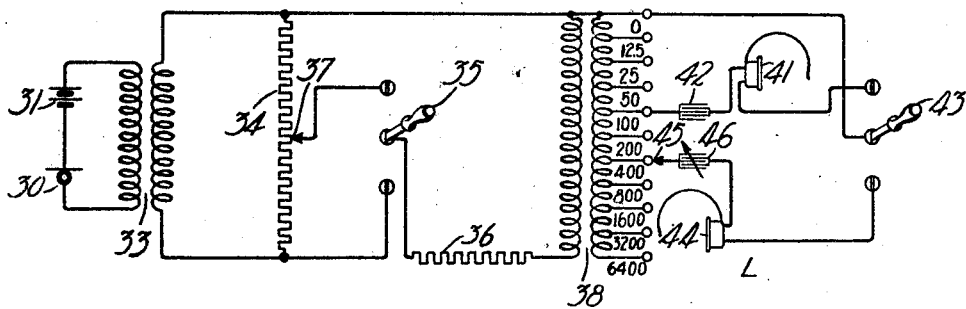

In the drawing, Fig. 1 represents a system for testing transmitters and Fig. 2 represents a system for testing receivers.

In Fig. 1, a standard transmitter 2, a source of energy 4, a resistance 7, and an ammeter A, are connected in series with a portion of the primary winding of transformer 11 when switch 9 is thrown in its up position. In like manner, a test transmitter 3, a source of energy 6, and a resistance 8 are connected in series with a portion of the primary of transformer 11 when switch 9 is thrown in its down position. The secondary of the transformer is in series with a receiver 18 and resistance 12 when switch 13 is closed in its up position and the potential of the secondary of transformer 11 is across receiver 18 and resistance 12 in series. Resistance 14 is connected across the terminals of the secondary winding and the lower terminal of switch 13 is connected to the movable contact 15 on resistance 14. When switch 13 is in its down position, the voltage across the receiver 18 and resistance 12 may be varied by moving contact 15 on resistance 14. In series with a voltmeter V is a double point switch 16, which may be manipulated to read the voltage across the transmitters and the batteries.

In the operation of this system, any suitable source of sound vibrations may be used to operate the transmitters 2 and 3. With the switch 9 thrown in its up position so as to include the standard transmitter 2 in circuit and with switch 13 closed in its up position, resistance 7 is varied until transmitter 2 is carrying the maximum current, indicated by ammeter 8, possible without detrimental effects, and the sound is then observed in the receiver 18. With switch 9 closed in its down position and switch 13 in its up position, as before, and resistance 8 adjusted until test transmitter 3 is receiving the maximum current possible without detrimental effects, adjustable contact 17 is moved along contacts of the primary of transformer 11 until the maximum volume of sound is produced in receiver 18. Should the volume of sound in receiver 18 be greater in this case than with the standard transmitter 2, it is an indication that the test transmitter 3 is more efficient than the standard transmitter. Then, in order to measure the increase in efficiency, switch 13 is closed in its down position and adjustable contact 15 is moved along the resistance 14 until the volume in receiver 18 is the same as was observed with switch 13 in its up position and the standard transmitter 2 connected in circuit by switch 9. With the resistance 14 calibrated in efficiency units, such as miles of standard cable, the increase in efficiency of transmitter 2 over that of 3 will be directly indicated. Now assuming that transmitter 3 proved to be less efficient than 2 as would be indicated by a decrease in volume under the preliminary operation, then the switch 13 is closed in its down position when switch 9 is closed in its up position. In the same manner, contact 15 is adjusted until the volume in receiver 18 with the standard transmitter 2 in circuit and switch 13 in its down position, is the same as that observed with the test transmitter 3 in circuit and switch 13 in its up position. In this case, the potentiometer 14 will indicate the decrease in efficiency of the test transmitter under that of the standard.

In order that the transmitter may be operated at its maximum efficiency which usually occurs at its maximum output the impedance of that portion of the primary of multi-tap transformer 11 across which the transmitter is connected should be the same as that of the rest of the transmitter circuit. For all practical purposes this impedance may be considered to be that of the transmitter itself if the circuit between the transformer and the transmitter has a negligible impedance to currents at voice frequencies. To fulfill this condition, a low impedance condenser 19 is used to bridge the resistance 8, the battery 6 and the ammeter A in series when the switch 9 is closed in its down position and the test transmitter is in circuit, and the resistance 7, the battery 4 and the ammeter A in series when the switch 9 is closed in its up position and the standard transmitter 2 is in circuit. Then the impedance of that portion of the primary of the transformer between taps 0 and 320, for example, is substantially the same as that of the test transmitter 3, and that portion of the primary of the transformer between taps 0 and 40 is substantially that of the standard transmitter 2. The maximum impedance of the primary of the transformer 11 should not be less than that of the standard transmitter or any transmitter it is desired to test. By dividing the impedance of the primary of the transformer 11 into geometrical units, the minimum number of taps is provided for any predetermined maximum allowable transmission loss, the maximum per cent error occurring when the resistance of the transmitter under test is midway between the impedance values of adjacent taps. The maximum per cent error is constant throughout the range of the primary and may be held within any predetermined amount by controlling the geometrical ratio, the smaller the ratio the greater the number of taps and consequently the smaller the error.

In the case illustrated, the ratio is 2 and the values of the impedance at the successive taps are 0, 5, 10, 20, 40, 80, 160, 320, 640, 1280 and 2560 ohms. Under this condition, a maximum allowable loss at any one tap is 0.2 miles of standard cable, which is sufficiently close for all commercial purposes.

By following the operations as given above, the power efficiency is obtained. However, under certain conditions it is desirable to know the constant current and the constant voltage efficiencies, and in either of these cases the operation is the same as for the power efficiency except, for the constant current efficiency both transmitters have the same direct current and for the constant voltage efficiency both have the same voltage across their terminals.

In Fig. 2, a transmitter 30, a source of energy 31, and the primary of transformer 33 are in series as in a local battery telephone circuit. Across the secondary of transformer 33 is a potentiometer resistance 34. One end of the potentiometer resistance 34 is connected directly to one terminal of the primary of transformer 38, the other end of resistance 34 is connected to the other terminal of transformer 38 through the lower contact of switch 35 and resistance 36 when switch 35 is in its down position. Under this condition, the potential of the secondary of transformer 33 is across resistance 36 and the secondary of transformer 38. Connected to the upper terminal of switch 35 is movable contact 37. This contact may be moved along the resistance 34 to vary the potential across resistance 36 and the secondary of transformer 38. The secondary of transformer 38 is provided with a plurality of taps. One end of the coil is connected to switch 43, and the upper contact of switch 43 is connected to a standard receiver 41 in series with which is a condenser 42 connected to one tap of the secondary of the transformer 38. The lower contacts of switch 43 are connected to a test receiver 44 in series with which is an adjustable condenser 46 connected to the secondary of transformer 38 through a movable contact 45.

In the operation of the testing circuit shown in Fig. 2, any suitable source of energy is used to operate the transmitter 30, or the transmitter and battery may be replaced by a generator of electrical currents, such as an oscillator. With the switch 35 in its down position and switch 43 in its up position, the volume of sound is observed in receiver 41. With switch 35 left in its down position, the switch 43 is closed in its down position, and condenser 46 and contact 45 are adjusted until the maximum sound is observed in receiver 44. Under these conditions it is well known that the impedance of the circuit looking away from the receiver terminal is conjugate to the impedance of the receiver. In other words, when the variable condenser 46 is adjusted so as to annul the reactance of the receiver at the important speech frequencies there will be a maximum transfer of energy from the transmitter to the receiver. Should the sound so observed be greater than that of the receiver 41, which would indicate the receiver 44 to be the more efficient, switch 35 is thrown to its up position and contact 37 adjusted until the sound observed in receiver 44 is the same as that of 41 with the switch 35 in its down position. However, should the sound observed in receiver 44 be less than that observed in receiver 41 under the preliminary conditions noted above, the sound in the receiver 41 with switches 43 and 35 in their up positions, is adjusted by moving contact 37 until it is the same as that observed in receiver 44 with switches 35 and 43 in their down positions. As in the case of the multiple tap transformer of Fig. 1, the multiple tap transformer 38 of Fig. 2 has its secondary divided into geometrical units, and the ratio in this case is 2 and the values of the taps are 0, 12.5, 25, 50, 100, 200, 400, 800, 1600, 3200 and 6400 ohms, which gives a range of adjustments sufficiently large to accommodate the present types of receivers in service.

What is claimed is:

1. In a system for testing speech transmission instruments, a test instrument, a standard instrument for comparison, means whereby both instruments may be operated at their maximum output comprising circuits having a conjugate impedance to that of the test and the standard instruments, respectively, and means for indicating directly their difference in efficiency.

2. In a system for testing speech transmission instruments, a test instrument, a standard instrument for comparison, means for operating the instruments at maximum output comprising circuits whose impedances are adjustable to values which are conjugate to the impedance of the test and the standard instruments, respectively, and means for equalizing the outputs of said instruments, said equalizing means adapted to indicate directly the difference in efficiency of the two instruments.

3. In a system for testing speech transmission instruments, a test instrument and a circuit therefor, a standard instrument and a circuit therefor, an induction coil having an adjustable primary sufficient of which is included in each of said circuits to permit said instruments to operate at maximum output, and means across the secondary of said coil for equalizing the output of the test and standard circuits.

4. In a system for testing speech transmission instruments, a test instrument and a circuit therefor, a standard instrument and a circuit therefor, an induction coil having an adjustable primary sufficient of which is included in each of said circuits to permit said instruments to operate at maximum output, and means across the secondary of said coil for equalizing the output of the test and standard circuits, said equalizing means indicating directly the difference in efficiency of the two instruments.

5. In a testing circuit, a branch including a test instrument, a second branch including a standard instrument for comparison, a third instrument for comparing the test and standard instruments, means for equalizing the terminal impedances, and means for equalizing the overall efficiency of each circuit, said equalizing means adapted to indicate directly the difference in efficiency of the test and standard instruments.

6. In a system for testing speech transmission instruments, a test instrument having a given impedance and a circuit therefor having the same impedance, a standard instrument having a given impedance and a circuit therefor having the same impedance, a circuit common to said test and said standard instrument circuits, and a potentiometer in said common circuit for indicating the relative efficiency of said instruments.

7. In a system for testing speech transmission instruments, circuits for testing the efficiency of transmitters and receivers including a multiple tap transformer for adjusting the circuit to operate the instruments at their maximum output, a standard instrument, and a potentiometer for equalizing the output of the test and standard instruments and adapted to indicate directly in transmission units the efficiency of the instrument under test.

In witness whereof, I hereunto subscribe my name this 10th day of November A. D., 1921.

HARVEY FLETCHER.